US009112918B2

(12) United States Patent
Schultz et al.

(10) Patent No.: US 9,112,918 B2
(45) Date of Patent: Aug. 18, 2015

(54) MULTI-MODE USER DEVICE AND NETWORK-BASED CONTROL AND MONITORING

(75) Inventors: Paul T. Schultz, Colorado Springs, CO (US); Mark J. Hahn, Stow, MA (US); Robert A. Sartini, Colorado Springs, CO (US); Todd M. Willis, Woodstock, MD (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 96 days.

(21) Appl. No.: 13/459,518

(22) Filed: Apr. 30, 2012

(65) Prior Publication Data

US 2013/0288656 A1    Oct. 31, 2013

(51) Int. Cl.
*H04M 3/00*    (2006.01)
*H04L 29/06*    (2006.01)
*H04M 1/725*    (2006.01)
*H04W 88/06*    (2009.01)
*H04W 4/02*    (2009.01)
*H04W 8/18*    (2009.01)

(52) U.S. Cl.
CPC .......... *H04L 69/24* (2013.01); *H04M 1/72563* (2013.01); *H04M 1/72569* (2013.01); *H04W 4/02* (2013.01); *H04W 8/183* (2013.01); *H04W 88/06* (2013.01)

(58) Field of Classification Search
CPC ............................... H04W 88/06; H04W 4/02
USPC ................... 455/418, 414.1, 414.2, 419, 420
See application file for complete search history.

(56) References Cited

U.S. PATENT DOCUMENTS

| | | | |
|---|---|---|---|
| 2003/0114149 A1* | 6/2003 | Lehtonen et al. | 455/418 |
| 2006/0072726 A1* | 4/2006 | Klein et al. | 379/201.01 |
| 2006/0168089 A1* | 7/2006 | Sampson | 709/207 |
| 2007/0099638 A1* | 5/2007 | Voltz | 455/500 |
| 2008/0005319 A1* | 1/2008 | Anderholm et al. | 709/224 |
| 2008/0318616 A1* | 12/2008 | Chipalkatti et al. | 455/550.1 |
| 2009/0165145 A1* | 6/2009 | Haapsaari et al. | 726/28 |
| 2011/0293084 A1* | 12/2011 | Bhagavatula et al. | 379/211.02 |
| 2012/0054853 A1* | 3/2012 | Gupta et al. | 726/17 |
| 2013/0002725 A1* | 1/2013 | Kim et al. | 345/684 |
| 2013/0223607 A1* | 8/2013 | Hillier | 379/215.01 |
| 2014/0007222 A1* | 1/2014 | Qureshi et al. | 726/16 |

* cited by examiner

*Primary Examiner* — Barry Taylor

(57) ABSTRACT

Methods, devices, and storage media for user devices to operate in multiple modes and provide mode indicators that indicate the mode in which the user device operates, and a network that provides multimode services that include monitoring service events associated with the multiple modes, control modes of operation, and allow users to view, manage, and classify service usage information that includes service event information and correlated mode information.

20 Claims, 8 Drawing Sheets

MULTI-MODE USER DEVICE AND NETWORK-BASED CONTROL AND MONITORING

BACKGROUND

Currently, mobile communication devices provide users with anywhere, anytime service. Mobile communication devices include various applications and provide user interfaces to allow users to use various services, access information, and communicate with other users.

DETAILED DESCRIPTION

The following detailed description refers to the accompanying drawings. The same reference numbers in different drawings identify the same or similar elements.

The term "mode" or "user device mode," as used herein, indicates a manner of operation by a user device. For example, a user device may operate in a work mode, a personal mode, and other types of user context modes. For example, the user context may relate to the user's profession (e.g., teacher, attorney, doctor, etc.), the user's familial position (e.g., mom, dad, etc.), the user's hobby (e.g., musician, painter, astronomer, gardener, etc.), or some other facet or role of the user's life (e.g., student, volunteer, etc.). In other words, the mode of the user device may support a particular user identity. The manner in which the user device operates, when in a particular mode, may include mode-specific, system level and/or application level functionality. For example, mode-specific functionality may include operations pertaining to access, appearance, etc., with respect to security, cryptography, applications, user interfaces (e.g., desktop, icons, menus, etc.) data, communications, storage, etc., associated with the user device and/or user device interaction with another device, user device interaction with a network, etc. The user device may operate in multiple modes simultaneously. A further description is provided below.

Figure 1:
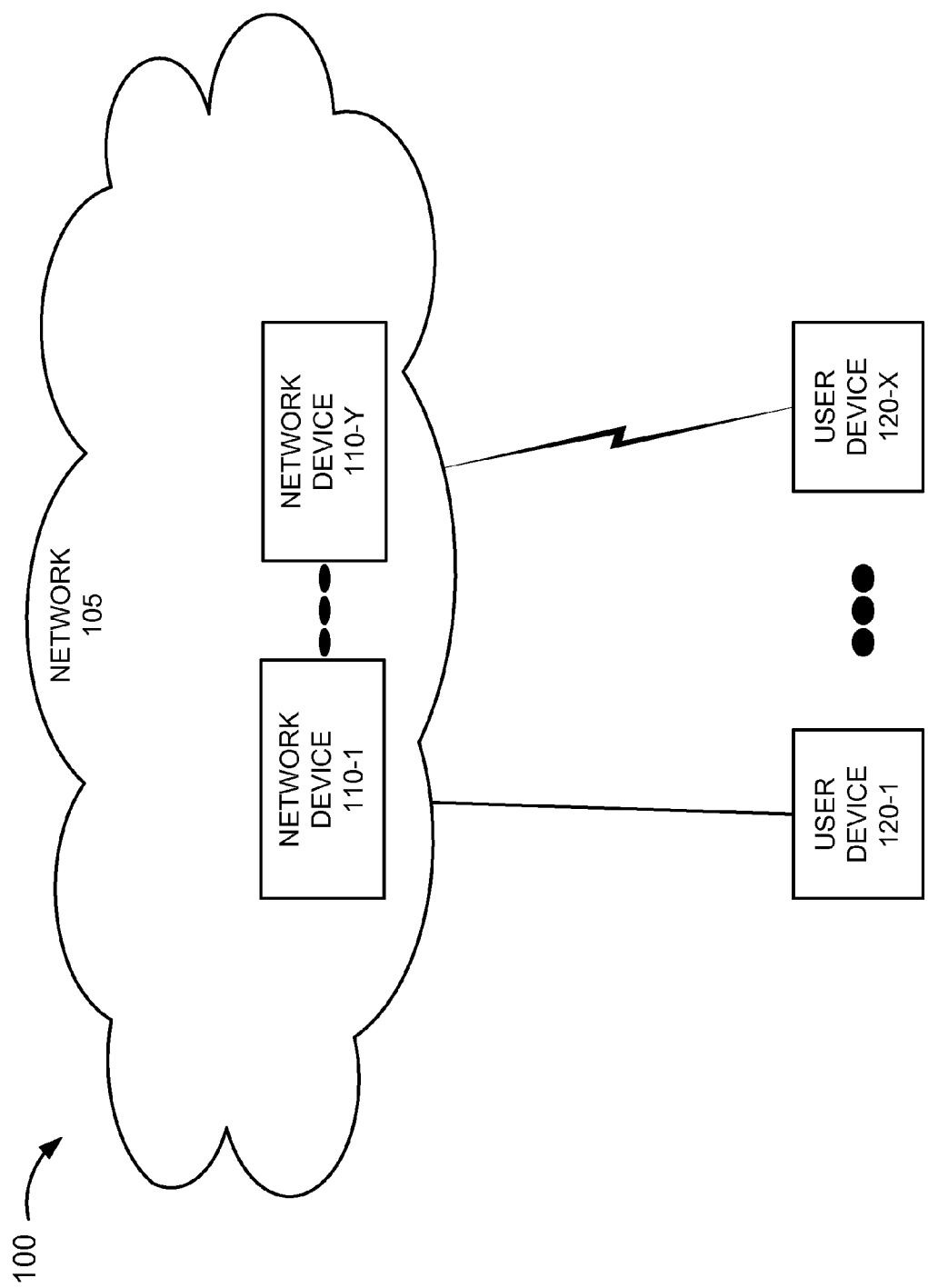
FIG. 1 is a diagram illustrating an exemplary environment in which embodiments may be implemented.

FIG. 1 is a diagram illustrating an exemplary environment 100 in which embodiments described herein may be implemented. As illustrated, environment 100 includes network 105 including network devices 110-1 through 110-Y, in which Y>1 (also referred to collectively as network devices 110 or individually as network device 110), and user devices 120-1 through 120-X, in which X>1 (also referred to collectively as user devices 120 or individually as user device 120). In practice, environment 100 may include additional network(s) and/or network device(s). For example, environment 100 may include an access network, intermediary network devices, etc.

Environment 100 may be implemented to include wired and/or wireless connections among the devices and network illustrated. A connection may be direct or indirect and may involve intermediary device(s) and/or network(s) not illustrated in FIG. 1.

Network 105 includes a network of one or multiple types. For example, network 105 may include a wireless network and a wired network. Network 105 may include a public network and/or a private network. Network 105 may provide, to users of user devices 120, access to other networks (not illustrated). Network 105 includes network devices 110.

Network devices 110 are capable of performing processes, as described herein. For example, network devices 110 are capable of monitoring and controlling multi-mode services, as described herein. One or more network devices 110 may be implemented as a computer, an application server device, a security device, a storage device, a database management system, a networking device, etc. Network device 110 may be implemented according to a centralized computing architecture, a distributed computing architecture, or a cloud service. Additionally, network device 110 may be implemented according to one or multiple network architectures (e.g., a client device, a server device, a peer device, or a combination thereof).

User device 120 includes a device having the capability to communicate with network 105. For example, user device 120 may be implemented as a smartphone, a wireless telephone, an IP telephone, a Web access device, a personal digital assistant (PDA), a personal communication system (PCS) terminal, a pervasive computing device, a computer, and/or some other type of device (e.g., a portable device, a mobile device, a handheld device, a stationary device, a vehicle-based device, a tablet device, a television that includes applications or other platform (e.g., Android platform, etc.), etc.) capable of performing a process, as described herein. Additionally, or alternatively, user device 120 may be implemented as a machine-to-machine device, for example an appliance, a thermostat, a garage door opener, an automobile, an entertainment device, a security system, an asset monitor, a robot, a medical device, etc. User device 120 may operate according to one or more wireless and/or wired network standards.

According to an exemplary embodiment, user device 120 operates in different modes. According to an exemplary implementation, user device 120 operates in a work mode and a personal mode. According to other implementations, user device 120 operates in other modes (e.g., a teacher mode, a student mode, a mom mode, or some other context-based mode), which include user-configurable modes. According to an exemplary embodiment, the mode in which user device 120 operates may be initiated by the user and/or by network 105 (e.g., one or more of network devices 110). According to an exemplary embodiment, when in a work mode, user device 120 may establish an encrypted virtual private network (VPN) connection. According to an exemplary embodiment, when in a work mode, user device 120 may provide other secure work environments, such as, for example, secure online storage, secure offline storage (e.g., on user device 120), secure communications (e.g., encrypted voice, video, messaging, etc.), etc. According to an exemplary embodiment, when user device 120 is implemented as a machine-to-machine device, user device 120 may operate in different modes that are based on device-specific functionality. For example, a security device may operate in a vacation mode, a house party mode, etc., in which parameters and/or functions performed by the device include mode-specific operational characteristics.

According to an exemplary embodiment, a user can setup and manage service usage modes via user device 120 or via user device 120 in communication with network 105 (e.g., a network portal). For example, a user can view, modify, and reclassify service usage events (e.g., communications, storage of data, use of an application, etc.) and classifications (e.g., work, personal, painter, etc.). According to an exemplary implementation, all usage activity by the user via the network portal, including usage reclassification, is logged. Additionally, according to an exemplary embodiment, a user may store service usage mode information on user device 120 to allow the user to apply this information to non-connected user devices 120.

According to an exemplary embodiment, user device 120 provides service usage mode indications and notifications (e.g., visual, audible, haptic). According to an exemplary implementation, the service usage indications and notifications indicate service usage classifications of service. By way of example, service usage indications and notifications include classifying communication notifications pertaining to communications (e.g., audio calls, video calls, instant messaging messages, e-mails, etc.,) as personal, work, etc. Additionally, according to an exemplary embodiment, mode indications may be communicated to and rendered by peripheral devices (e.g., a headset, display glasses, a television, etc.). According to an exemplary embodiment, user device 120 prioritizes service events (e.g., a high priority work mode service event, a low priority personal mode service event, etc.). By way of example, assume that the user is communicating (e.g., over the telephone) with his/her boss while user device 120 is operating in a work mode, and the user's spouse calls, user device 120 indicates that the call is a personal mode service event, provides caller identification information, and provides a quick response absent user input. According to this example, user device 120 or network device 110 prioritizes the work-related call, while operating in work mode, over the personal call based on the mode of user device 120 and the calling party (e.g., the user's boss). Additionally, user device 120 may prioritize a service event based on other information, such as, for example, the location of the user, time and day information, history information (e.g., past instances when the user is speaking with his/her boss, and the spouse calls, etc.), etc. According to an exemplary implementation, network 105 may provide call-screening features to override priorities. By way of example, assume that the user's spouse is calling because of an accident or other important circumstance. Network 105 may allow the calling party (e.g., the user's spouse) to indicate a priority which will allow the call to go through to the user. Additionally, user device 120 may provide additional notifications or indicators that, among other things, indicate the importance of the call and/or that the calling party requested that the call be treated as an overriding service event. In this way, application-driven quality of service may be leveraged in prioritization of a service event, such as a communication event.

Further to the above example, according to an exemplary embodiment, service event priorities may be identified by user device 120 and/or network 105 based on various types of information, such as current mode of operation of user device 120, context information, user preferences, user-invoked priority, calling party, etc. According to an exemplary implementation, a mode of user device 120 includes service event priority functionality.

According to an exemplary embodiment, user device 120 includes quick response capabilities for each of the service modes. For example, user device 120 selects a quick response (e.g., a text message (e.g., SMS)) or other type of communication (e.g., e-mail, IM, voice or text-to-speech message, video message, etc.), in response to receiving a telephone call. According to an exemplary embodiment, user device 120 automatically selects a quick response based on the mode of user device 120. For example, the user may store quick responses to be used on a per mode basis. For example, a quick response to be used when user device 120 is in a personal mode may be more informal than a quick response to be used when user device 120 is in a work mode. In this way, the user may store quick responses that are tailored to the mode of user device 120. User device 120 may select a quick response based on a correlation between the communicating party and a mode. For example, a contact entry (e.g., the user's spouse) may be correlated with a personal mode, while a contact entry (e.g., the user's boss) may be correlated with a work mode. According to another embodiment, the user may manually select a quick response. According to another embodiment, network 105 may automatically select a quick response based on being aware of the current mode of user device 120, knowledge of the correlation between the communicating party and the mode, user preferences, etc.

According to an exemplary embodiment, user device 120 and/or network 105 may generate rich-presence information based on the mode of operation of user device 120. By way of example, assume that a user is speaking with his/her boss over the telephone when user device 120 is in a work mode. According to this example, the rich-presence information may indicate the user's activity and the mode of user device 120 (e.g., business call—work mode). User device 120 and/or network 105 may also infer other, more standard forms of presence information based on the caller/called party, such as (e.g., business call—work mode—do not disturb), (e.g., business call—work mode—important), or other types of user-customized messages based on the mode of operation of user device 120.

According to an exemplary embodiment, network 105 provides service usage control and monitoring. For example, network 105 monitors and classifies all service usage events by service usage mode (e.g., personal, work, etc.). According to an exemplary embodiment, network 105 obtains session information pertaining to communications associated with user device(s) 120 and a user to allow network 105 to track, classify, infer and log service usage on a per-user, per-user device, and per-mode basis. According to an exemplary embodiment, network 105 provides deep packet inspection (e.g., to determine, classify usage, etc.) of all traffic over a VPN for work mode usage.

According to an exemplary embodiment, user device 120 logically partitions specific usage mode information (e.g., data, usage logs, contact information, etc.). According to an exemplary implementation, user device 120 may include a virtual machine (e.g., an isolated guest operating system, a Java Virtual Machine, etc.) for each mode of operation. For example, while operating in work mode, user device 120 may secure, via techniques including encryption and isolation, usage work mode information. According to an exemplary embodiment, network 105 partitions usage mode information based on a correlated mode. According to an exemplary implementation, network 105 uses context information to intelligently determine a service usage mode and may restrict access to secured data when appropriate.

According to an exemplary embodiment, network 105 and/or user device 120 uses context information to infer a user's preferred usage mode for user device 120. According to an exemplary implementation, context information includes user location, date and time, calendar information, presence information, usage history, identified patterns of usage based on usage history, user preferences, mobile device sensor information (e.g., biometric sensors, accelerometer, compass, etc.), address book information, type of user device being used (e.g., vehicle-based, computer, etc.).

According to another embodiment, user device 120 and/or network 105 automatically tags a service event as belonging to or correlating with a particular mode. According to an exemplary embodiment, the user may manually tag, via user device 120, a service event as relating to a particular mode. For example, the user may receive a communication from a party that is not included in the user's contacts list and/or the contact entry of the party is not correlated with a particular mode. In this way, the user may manually tag the communication (i.e., the service event) to correlate with a particular mode (e.g., personal, etc.). Additionally, the user may add the calling party to his/her contacts list and indicate that this party pertains to a work mode, or tag an already existing contact entry to indicate that the calling party relates to a work mode. In this way, when the user receives subsequent communications from this party, user device 120 may assign the service event with the proper mode. User device 120 may share mode tagging with network 105.

According to an exemplary embodiment, network 105 and/or user device 120 supplements service usage control and monitoring event tagging with context information. Additionally, according to an exemplary implementation, network 105 and/or user device 120 may infer a tag to assign to a service event based on context information.

According to an exemplary implementation, network 105 organizes, annotates, searches, and retrieves service usage control and monitoring information from a database of personalized stored service usage data. According to an exemplary implementation, network 105 learns user context, user behavior, and user preferences based on user history and patterns of usage. According to an exemplary implementation, network 105 may learn user behavior and preferences based on context information, network-based history, user device-based history, etc. According to an exemplary implementation, network 105 allows a user to dynamically specify a service usage mode.

According to an exemplary embodiment, network 105 provides an authentication and authorization service for work mode usage. According to an exemplary implementation, network 105 uses various types of information (e.g., network address associated with user device 120, user device connectivity information, user device location, historical information, etc.) to streamline the authentication and authorization service.

While exemplary embodiments provided in this description may be implemented based on the use of a particular network architecture, platform, etc., such implementations are not intended to be restrictive or provide an exhaustive treatment, as such. In other words, the embodiments described herein may be implemented using other suitable network architectures, platforms, etc., which may not be specifically described.

Figure 2:
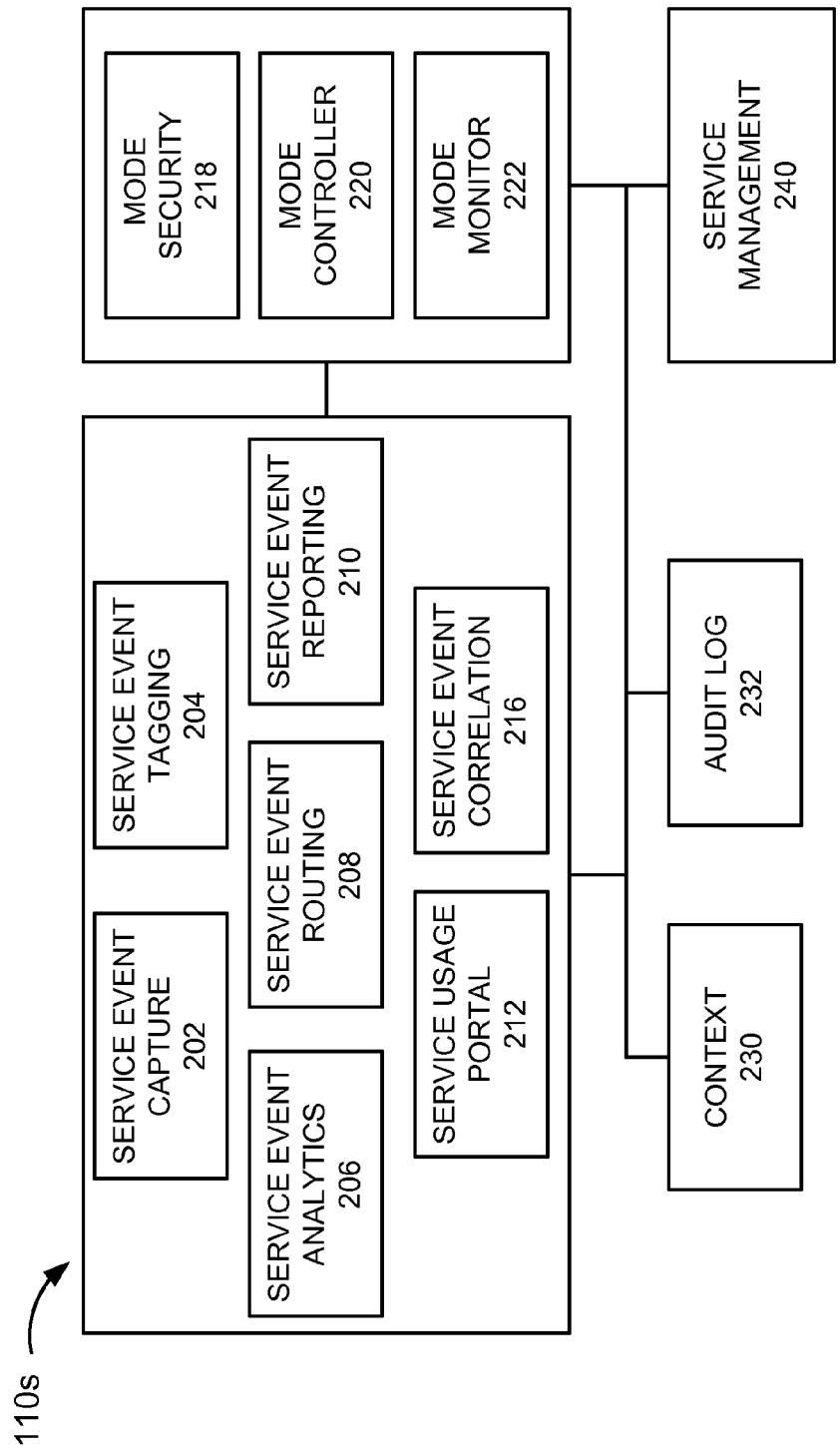
FIG. 2 is a diagram illustrating exemplary network elements included in the network devices depicted in FIG. 1.

FIG. 2 is a diagram illustrating exemplary network elements (e.g., logic) of network devices 110. As illustrated, network devices 110 include a service event capture 202, a service event tagging 204, a service event analytics 206, a service event routing 208, a service event reporting 210, a service usage portal 212, an event correlation 216, a mode security 218, a mode controller 220, a mode monitor 222, a context 230, an audit log 232, and a service management 240.

The number of network elements and the configuration are exemplary. According to other embodiments, network devices 110 may include additional network elements, fewer network elements, different network elements, and/or differently arranged network elements, than those illustrated in FIG. 2. For example, network devices 110 may include network elements that provide various services, such as television service, Internet service, video streaming service, mobile service, landline telephone service, and/or a machine-to-machine service, provide various assets, etc., or alternatively access to one or more of these various services, assets, etc.

Also, according to other embodiments, one or more functions and/or processes described as being performed by a particular network element may be performed by a different network element, or some combination of network elements, which may or may not include the particular network element.

According to other embodiments, a single network element depicted in FIG. 2 may be implemented as multiple network elements. Conversely, multiple network elements depicted in FIG. 2 may be implemented as a single network element. Referring to FIG. 2, service event capture 202 includes logic to capture information pertaining to a service event. According to an exemplary implementation, a service event may include any operation performed by user device 120. For example, service events may include accessing and using an application or a service, receiving a communication, transmitting a communication, storing data, etc. As a result of the occurrence of a service event, service event capture 202 obtains service event information. By way of example, with respect to service events that are communication-related, service event capture 202 may obtain session information. The session information may include information identifying parties to a communication, the form of communication (e.g., IM, e-mail, telephone call, video call, etc.), network address information, correlated mode associated with the communication, data and time, duration of communication, etc. According to an exemplary embodiment, service event capture 202 includes logic to perform deep packet inspection to obtain session information. According to other types of service events, such as service events occurring on user device 120 when user device 120 is not connected to network 105 (e.g., executing and using an application, accessing and viewing data stored on user device 120, etc.), service event capture 202 may obtain service event information from user device 120. Service event capture 202 may also capture or obtain context information.

Service event tagging 204 includes logic to assign a mode to a service event. Service event tagging 204 may assign the mode to a service event based on a network-initiated tagging (e.g., based on information from event correlation 216) or a user-initiated tagging.

Service event analytics 206 includes logic to analyze information obtained by service event capture 202 and other information pertaining to a service event (e.g., information included in service management 240, context information included in context 230, etc.). Service event analytics 206 may identify usage patterns based on usage history, context information, etc.

Service event routing 208 includes logic to route a session event to a network element to provide a particular network response and/or service. Depending on the type of session event and mode, service event routing 208 selects one or multiple network elements to provide an appropriate network response or service.

Service event reporting 210 includes logic to generate reports pertaining to service usage. For example, service event reporting 210 may generate an end-of-the-month report based on service usage information. A report may be available to users via service usage portal 212 and/or analysis by service event analytics 206.

Service usage portal 212 includes logic to allow users to manage multi-mode-services. For example, users may view service events and their correlated mode. Additionally, users may reclassify service events from one mode to another, set user preferences to be carried out by network devices 110, create a mode to be managed by network devices 110, delete a mode, etc.

Service event correlation 216 includes logic to correlate a service event to a mode. For example, service event correlation 216 may correlate a service event to a mode based on information from service event analytics 206. By way of example, assume the user receives a business telephone call during the weekend, when user device 120 is in a personal mode. Thereafter, the user conducts a teleconference with co-workers. Service event correlation 216 includes intelligence to infer that these service events pertain to a work mode.

Mode security 218 includes logic to determine when to use security measures and to provide such security measures. For example, a security measure may include encryption, secured storage of data, a secure connection (e.g., a VPN connection), a secure communication, and/or other form of security measure (e.g., virus scanning of user device 120, etc.). According to an exemplary implementation, mode security 218 may be invoked when user device 120 operates in a particular mode. For example, when user device 120 operates in work mode, mode security 218 provides security measures for service events, such as secure communications, etc.

Mode controller 220 includes logic to control network-initiated mode selection. For example, mode controller 220 may use information from other network elements described (e.g., service event correlation 216, context 230, etc.) to switch user device 120 to a mode, or to assign a mode to a service event (e.g., to assign a mode to a telephone call to be indicated by a mode indicator on user device 120, etc.). According to an exemplary implementation, signaling between user device 120 and mode controller 220 occurs so that mode controller 220 is aware of the current mode(s) in which user device 120 operates. Alternatively, according to another exemplary implementation, mode controller 220 may identify the current mode(s) in which user device 120 operates based on service event information, context information, etc., associated with a service event.

Mode monitor 222 includes logic to monitor service events within a mode. For example, mode monitor 222 may identify abuse, by a user, when operating user device 120 in a mode. As an example, a work mode may support security measures and various services (e.g., secure connections, secure storage, etc.) that may be paid for by a user's employer. According to an exemplary scenario, assume the user starts using secure connections, while in work mode, to conduct personal service events. Mode monitor 222 identifies such activities as being outside of permitted behavior. Mode monitor 222 may generate and provide a notification (e.g., an alert, a warning, etc.) to the user and/or to other interested parties.

Context 230 includes logic that manages and stores context information. For example, context information may include user location, date and time, calendar information, presence information, usage history, identified patterns of usage, user preferences, mobile device sensor information, address book information, type of user device being used (e.g., vehicle-based, computer, etc., etc.).

Audit log 232 includes logic that stores logs of user activity pertaining to service usage portal 212. For example, an audit log may include information identifying when and what activities a user performed via the network portal of service usage portal 212. By way of example, a user may reclassify a service event from a personal mode to a work mode. Audit log 232 stores information that indicates this user activity.

Service management 240 includes logic that manages and stores various types of information for providing network services. For example, the various types of information include service information (e.g., types of services subscribed to by users, including multi-mode services), user device profile information (e.g., user device capabilities, user device identifiers, etc.), network information (e.g., session information, types of connection used by users, etc.), subscriber information (e.g., user profiles), service usage history information, and privacy, permissions, and preferences information (e.g., including information pertaining to multi-mode services). Service management 240 may also include provisioning and charging logic.

Service management 240 may include logic to disable user device 120 in the event user device 120 is lost or stolen. Mode controller 220 and mode security 218 may work cooperatively to provide efficient use of network security resources, e.g., VPN, in order to provide just-in-time security as needed while minimizing use of network security resources (and to minimize user device 120 battery drain). Service management 240 may also include logic to manage and store various third party calendars and schedules associated with user device 120, the end user, or personas that then establish corresponding modes. Service management 240 could provide an entry point and functional logic for non-scheduled events that then establish corresponding modes for target devices 120, e.g., priority QoS for a first responder device 120 in the event of a civil emergency.

Figure 3:
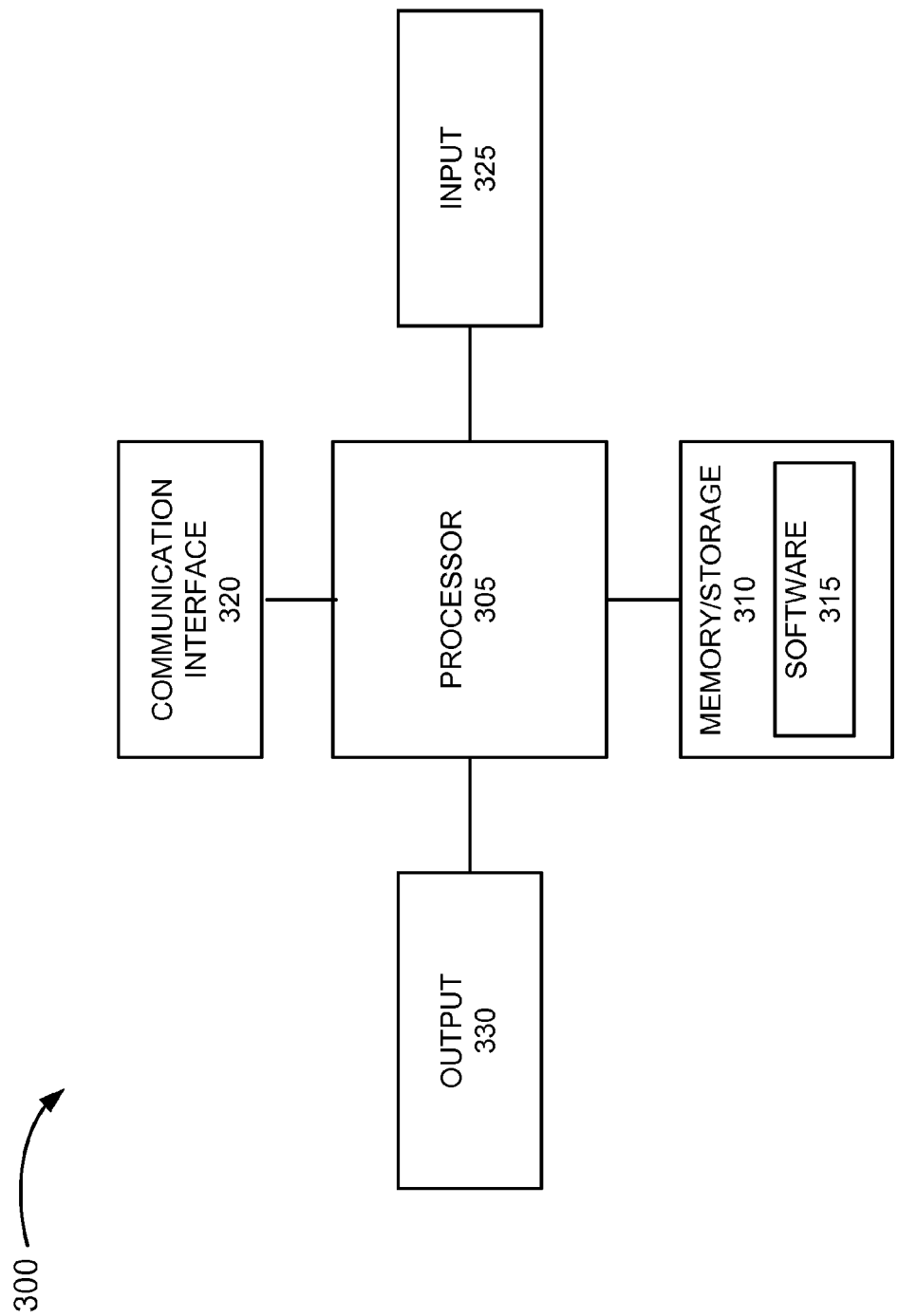
FIG. 3 is a diagram illustrating exemplary components of a device that may correspond to one or more of the devices depicted in the previous figures.

FIG. 3 is a diagram illustrating exemplary components of a device 300 that may correspond to one or more of the devices depicted in the previous figures. As illustrated, according to an exemplary embodiment, device 300 includes a processor 305, memory/storage 310, software 315, a communication interface 320, an input 325, and an output 330. According to other embodiments, device 300 may include fewer components, additional components, different components, and/or a different arrangement of components than those illustrated in FIG. 3 and described herein.

Processor 305 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., memory/storage 310), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 may include one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 may include an application or a program that provides a function and/or a process. Software 315 may include firmware. For example, network device 110 may include software 315 (e.g., a program or an application) to implement a network element. Additionally, for example, user device 120 may include software 315 (e.g., an application or a program) to implement a process or a function, display a user interface, provide a feature of a mode, communicate with network 105, communicate with network device 110, etc.

According to an exemplary embodiment, software 315 includes a virtual machine for each mode. For example, user device 120 may include a virtual machine pertaining to a personal mode, a virtual machine pertaining to a work mode, etc. The virtual machine provides in whole or in part the functionality, appearance, etc., pertaining to a mode. The virtual machine supporting a mode may be, for example, an isolated guest operating system installation within a normal host operating system, e.g., the host operating system of user device 120. The software running inside a mode-specific virtual machine may be limited to the resources and abstractions provided by the virtual machine. In this manner, resources within user device 120 (e.g., storage, networking, applications) operating in one mode, e.g., work mode, may be isolated from resources operating in another mode, e.g., personal mode.

Communication interface 320 permits device 300 to communicate with other devices, networks, systems, etc. Communication interface 320 may include one or multiple wireless interfaces and/or wired interfaces. Communication interface 320 may include one or multiple transmitters, receivers, and/or transceivers. Communication interface 320 may operate according to one or multiple protocols, standards, and/or the like. Communication interface 320 may include location-aware logic (e.g., a GPS receiver, etc.).

Input 325 permits an input into device 300. For example, input 325 may include a keyboard, a mouse, a display, a touchscreen, a touchless screen, a button, a switch, an input port, a microphone, speech recognition logic, biometric logic (e.g., fingerprint recognition, voice recognition, facial recognition, etc.) and/or some other type input component. Output 330 permits an output from device 300. For example, output 330 may include a speaker, a display, a touchscreen, a touchless screen, a light, an output port, and/or some other type of visual, auditory, tactile, etc., output component. Device 300 may include other types of components. By way of example, device 300 may include a compass, an accelerometer, and/or other types of sensors or components.

Device 300 may perform processes and/or functions, as described herein, in response to processor 305 executing software 315 stored by memory/storage 310. By way of example, instructions may be read into memory/storage 310 from another memory/storage 310 or from another device via communication interface 320. The instructions stored by memory/storage 310 may cause processor 305 to perform one or more processes described herein. Alternatively, for example, according to other implementations, device 300 may perform one or more processes described herein based on the execution of hardware (processor 305, etc.).

According to an exemplary embodiment, user device 120 provides various user interfaces pertaining to the multiple modes of operation, as described herein. For example, according to an exemplary embodiment, user device 120 includes a user interface to permit a user to initiate a change of mode. For example, the user may change the current mode of user device 120 (e.g., a personal mode) to another mode (e.g., a work mode, or some other mode) by selecting a graphical element (e.g., an item from a menu, an icon, etc.). As previously described, according to another exemplary embodiment, network 105 may initiate a mode change with respect to user device 120 and/or network services (e.g., multi-mode services).

According to an exemplary embodiment, user device 120 includes a user interface that indicates the mode in which user device 120 is operating. In this way, the user has a visual indication of the currently operating mode(s). Additionally, according to an exemplary embodiment, user device 120 provides other mode indicators, such as auditory mode indicators and haptic mode indicators. For example, auditory mode indicators may use various auditory cues (i.e., sounds) to indicate a mode and/or a service event (e.g., the occurrence of a service event) that correlates with a mode. Additionally, for example, haptic mode indicators may use various haptic cues to indicate a mode and/or a service event that correlates with a mode. Visual, auditory, haptic cues may vary based on the various characteristics, such as, speed, intensity, frequency, duration, tempo, color, etc.

According to an exemplary embodiment, user device 120 includes hotspot capabilities. According to an exemplary embodiment, when user device 120 operates in a work mode, user device 120 initiates a secured connection (e.g., a VPN connection). According to an exemplary embodiment, user device 120 sets up and tears down a separate, secure connection in an efficient manner to minimize user device resource utilization (e.g., processing, battery, etc.). For example, assume that user device 120 is in a personal mode and connected to the Internet (e.g., web surfing). Thereafter, the user wishes to store some files on the company server at work. The user may initiate a work mode session in which user device 120 automatically initiates a separate secure connection. For example, user device 120 maintains the connection to the Internet and also establishes a VPN connection. According to an exemplary implementation, the VPN connection is secure and controlled. Additionally, for example, the usage may be paid for by the user's employer. According to an exemplary embodiment, network 105 and/or user device 120 performs monitoring, usage logging and usage classification, as described herein.

The user retrieves the files from a secure storage area, which is resident on user device 120, and uploads the files to the company server. After completing the upload, the user indicates to stop work mode. User device 120 automatically releases the secure connection, in response to the user's indication to stop work mode.

Figure 4:
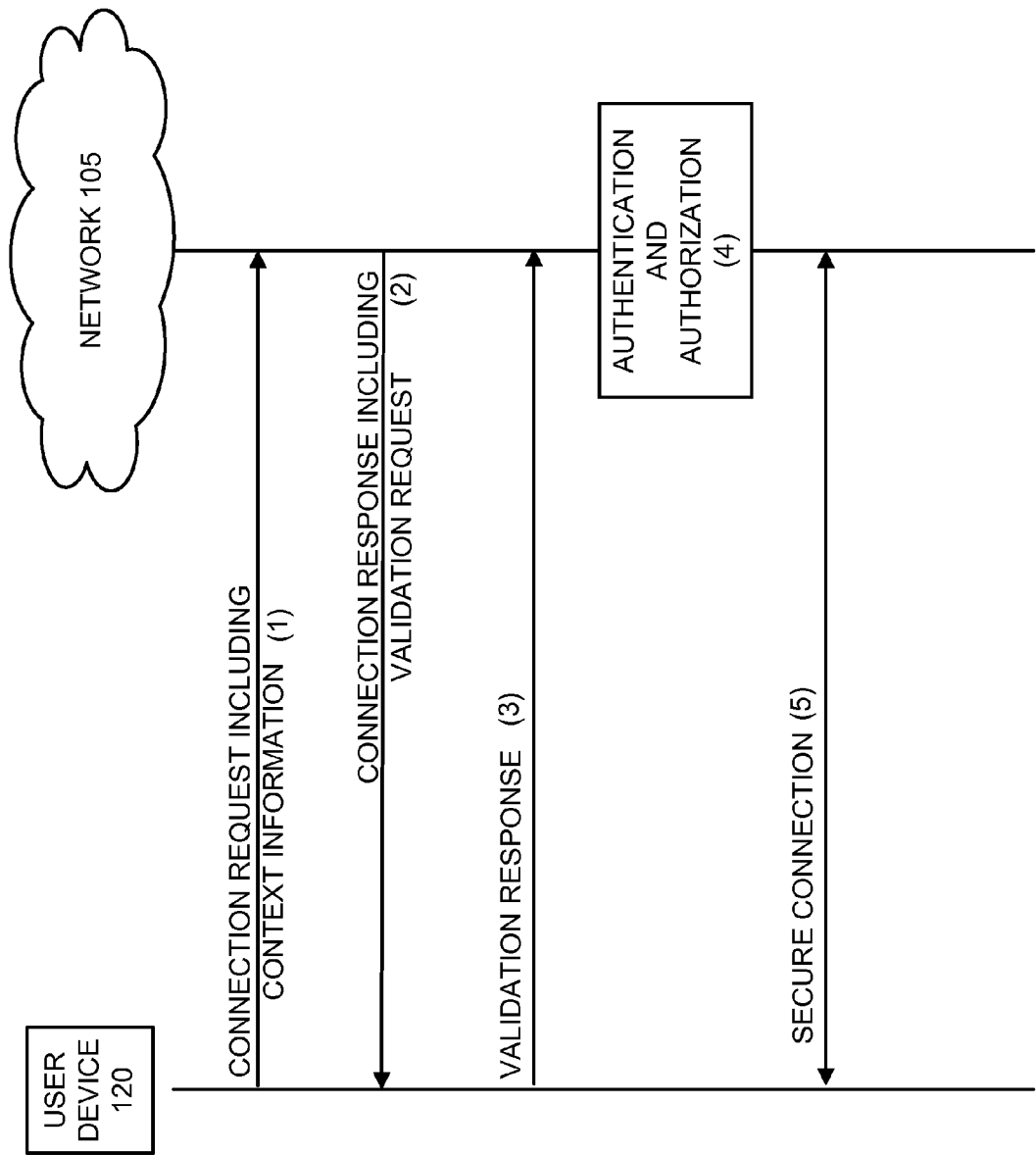
FIG. 4 is a diagram illustrating exemplary messages when the user device operates in work mode.

FIG. 4 is a diagram illustrating an exemplary messaging flow. For example, user device 120 transmits a connection request that includes context information pertaining to a new session. By way of example, the context information may include information identifying the location of a user, network connectivity status, recent history/events, user device's active/running services/application, and user device's system resources and battery status. In response, network 105 transmits a connection response that includes a validation request. The validation request may require authentication and authorization information. Alternatively, the connection request includes authentication and authorization information. For example, user device 120 displays a user interface to allow the user to enter a user name and password. Additionally, or alternatively, user device 120 obtains other forms of authentication and authorization information (e.g., biometric information, such as voice recognition, facial recognition, fingerprint recognition, iris recognition, etc.). As further illustrated in FIG. 4, in response to receiving the validation request, user device 120 transmits a validation response. The validation response includes authentication and authorization information. Network 105 performs authentication and authorization processes based on the received validation response and/or context information. According to this exemplary scenario, it may be assumed that the user is successfully authenticated and authorized. Network 105 and user device 120 establish a secure connection. According to an exemplary implementation, user device 120 may display, via a user interface, attributes of the new session. For example, the user interface may indicate to the user that a secure connection has been established and that the usage is being monitored, logged, etc.

Figure 5:
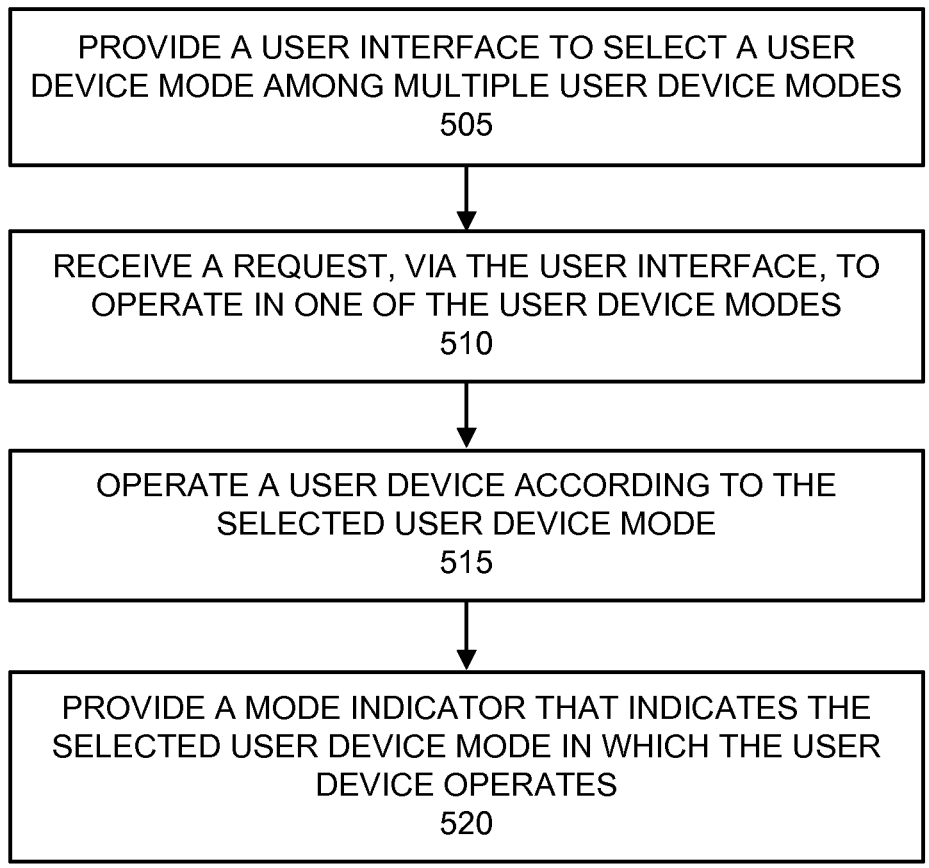
FIG. 5 is a flow diagram illustrating an exemplary process for a user-initiated entrance into a mode of a user device.

According to the exemplary process described in FIG. 4, network 105 may use context information for various mode-related network-decision making. For example, network 105 may use context information to infer a mode and perform a network-initiated mode change. Described below are some of the exemplary processes that may be performed when providing multi-mode services. According to an exemplary embodiment, user device 120 may operate in a mode based on a user-initiated event. FIG. 5 is a flow diagram illustrating an exemplary process 500 for a user-initiated entrance into a mode of user device 120 according to an exemplary embodiment. Process 500 is performed by user device 120. For example, processor 305 of user device 120 may execute software 315 to perform the steps described.

Process 500 begins, in block 505, with providing a user interface to select a user device mode among multiple user device modes. For example, user device 120 provides a user interface to allow a user to select a mode in which user device 120 is to operate. By way of example, the user interface may include a graphical element to permit the user to select a user device mode.

In block 510, a request is received, via the user interface, to enter one of the user device modes. For example, user device 120 receives a user selection, via the user interface, of a user device mode.

In block 515, a user device operates according to the selected user device mode. According to an exemplary embodiment, user device 120 includes virtual machine logic for each mode. User device 120 selects and operates according to virtual machine logic that provides the capabilities and functionality associated with the selected user device mode.

In block 520, a mode indicator that indicates the selected user device mode is provided. For example, user device 120 may provide a user interface that visually indicates to the user the mode in which user device 120 operates. Additionally, or alternatively, user device 120 may provide an auditory cue and/or a haptic cue that indicates to the user the mode in which user device 120 operates.

According to an exemplary embodiment, user device 120 stores a user preference that governs the type of mode indicator (e.g., visual, auditory, haptic) to be provided. According to an exemplary embodiment, user device 120 stores a user preference that governs the form of the mode indicator. For example, the user may select a particular graphical element (e.g., an icon, etc.), a particular auditory cue (e.g., a sound clip, etc.), and/or a particular haptic cue (e.g., a vibrational pattern, etc.). User device 120 provides the mode indicator based on the stored user preference(s).

Although FIG. 5 illustrates an exemplary process 500 to enter a mode, process 500 may include additional operations, fewer operations, and/or different operations than those illustrated in FIG. 5 and described herein. By way of example, the user may select a mode by voice command. For example, user device 120 may include speech recognition logic that recognizes voice commands for selecting a mode to enter, a mode to exit a mode, etc. Alternatively, user device 120 may automatically enter a mode of operation based on context information. By way of example, user device 120 may identify the location of the user (e.g., a work location) and in response, automatically enter a work mode. According to another example, user device 120 may enter and/or exit a mode of operation based on other forms of context information, such as calendar events, date and time, usage history, user preferences, etc.

According to an exemplary embodiment, user device 120 may operate in a mode or assign a mode to a service event in response to a network-initiated event. By way of example, user device 120 may receive or transmit a communication (e.g., a telephone call) for beginning a teleconference, which is work related. Network 105 detects and analyzes the service event, and recognizes that the service event is work-related. Network 105 causes user device 120 to operate in a work mode. Additionally, or alternatively, network 105 causes user device 120 to assigns a work mode for the service event. According to another example, the user may access the service usage portal of network 105 and requests an access to service usage information pertaining to a work mode. In response, assuming user device 120 is not currently operating in a work mode, network 105 may cause user device 120 to operate in the work mode.

Figure 6:
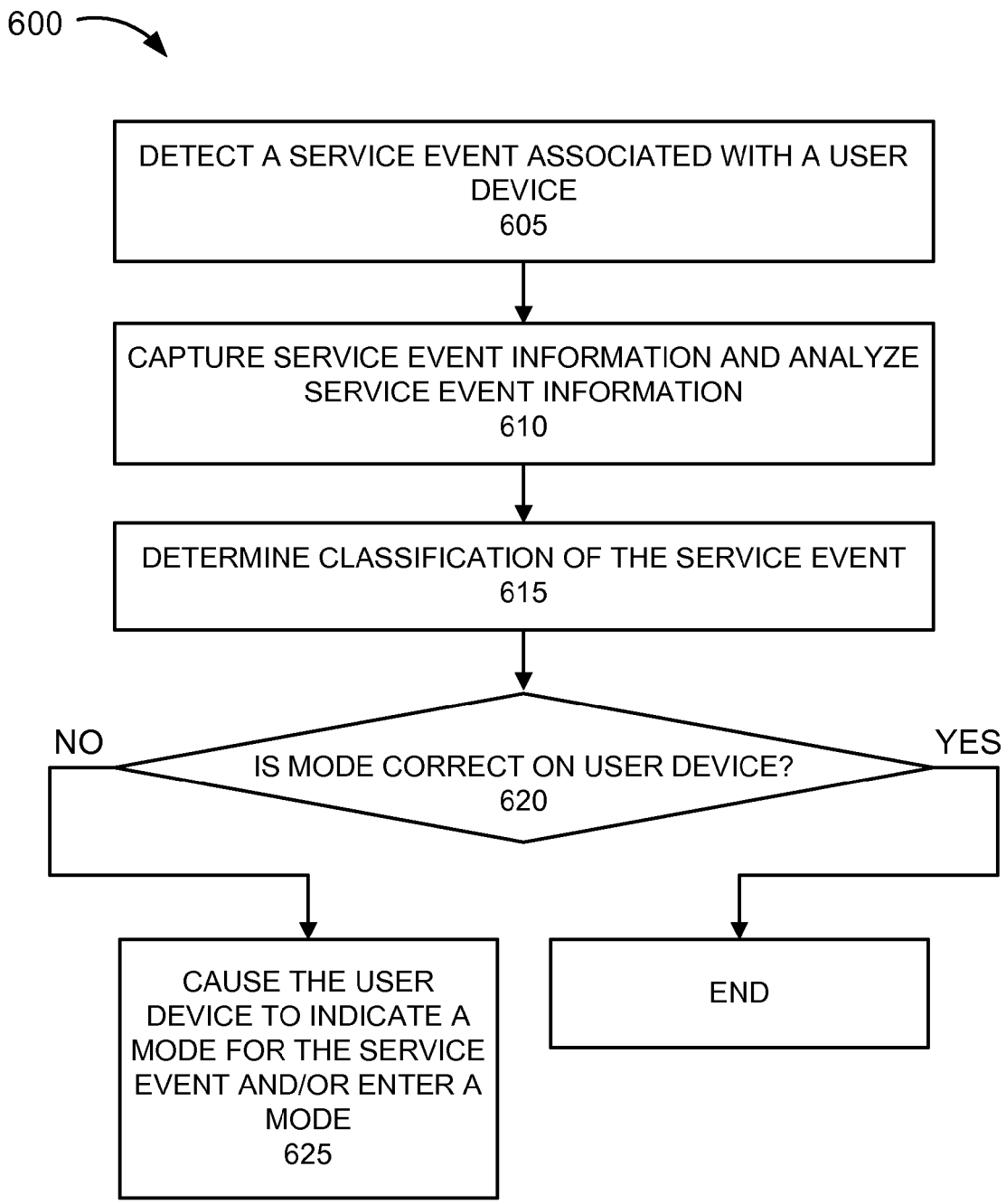
FIG. 6 is a flow diagram illustrating an exemplary process for a network-initiated entrance into a mode of user device.

FIG. 6 is a flow diagram illustrating an exemplary process 600 for a network-initiated entrance into a mode of user device 120 according to an exemplary embodiment. Process 600 is performed by one or more of network devices 110 that include one or more network elements. For example, processor 305 of network device 110 may execute software to perform the steps described.

Process 600 begins, in block 605, with detecting a service event associated with a user device. For example, service event capture 202 detects a service event. By way of example, assume that the user receives a telephone call from another party when the user is at work on a work day (e.g., Wednesday). Additionally, assume that the user has been doing some web surfing and user device 120 is operating in a personal mode. Also, assume that the telephone call is received around 1:05 p.m.

In block 610, service event information is captured and analyzed. For example, service event capture 202 captures service event information. For example, service event capture 202 obtains session information pertaining to the telephone call and obtains context information. The context information includes information that identifies the user's location (e.g., at work), the day and time. Service event analytics 206 analyzes the service event information. For example, service event analytics 206 uses usage history information to identify that the calling party is unknown (e.g., the user has not previously placed a call to nor received a call from the calling party—within a time window associated with the usage history information). Additionally, service event analytics 206 interprets the context information to determine that, for example, the user is at work on a Wednesday, and the telephone call is received during normal working hours.

In block 615, a classification of the service event is determined. For example, service event correlation 216 uses analysis information provided by service event analytics 206 to correlate the service event to a mode. For example, service event correlation 216 determines that the mode associated with the telephone call should be correlated to a work mode and/or that user device 120 should be operating in the work mode. Service event tagging 204 tags the telephone call as a work mode, service event based on correlation information provided by service event correlation 216.

In block 620, it is determined that whether the user device is in the correct mode and/or the service event is correlated to the correct mode. For example, service event correlation 216 provides correlation information to mode controller 220. Service event correlation 216 may also provide correlation information to mode monitor 222. In response, mode controller 220 identifies the mode in which user device 120 operates and/or the mode with which user device 120 correlates the service event (i.e., the telephone call). For example, mode controller 220 may signal user device 120 to obtain this information.

If it is determined that the user device is not in the correct mode and/or the service event is not correlated to the correct mode (block 620—NO), then an entry into a mode and/or a mode indicator for the service event is caused to occur on the user device (block 625). For example, mode controller 220 causes user device 120 to enter into a work mode and/or to identify the telephone call as a work-mode service event, for service usage information purposes.

If it is determined that the user device is in the correct mode and/or the service event is correlated to the correct mode (block 620—YES), then process 600 ends.

Although FIG. 6 illustrates an exemplary process 600 to enter a mode, process 600 may include additional operations, fewer operations, and/or different operations than those illustrated in FIG. 6 and described herein. For example, network 105 may provide other multi-mode services pertaining to a service event. By way of example, based on classifying that the telephone call is associated with a work mode, network 105 may provide the option to the user to upgrade (e.g., re-invite) or reestablish the telephone call over a secure line. Additionally, or alternatively, service event routing 208 may notify the provisioning and charging logic associated with service management 240. For example, the telephone call may be paid for by the user's employer.

According to the scenario described above, according to an exemplary embodiment, the user may override a network-initiated mode command. For example, the user may exit the work mode during the telephone call and select the appropriate mode (e.g., artist mode, etc.). Additionally, or alternatively, the user may reclassify the service event (e.g., the telephone call) with the appropriate mode (e.g., via service usage portal 212).

According to other scenarios, network 105 may initiate a mode of operation on user device 120 during the onset of a communication. For example, assume that user device 120 receives a telephone call to join a teleconference (e.g., from a conferencing service provider, or a party known to be associated with work calls). According to such scenarios, network 105 may perform a network-initiated mode invocation.

Figure 7:
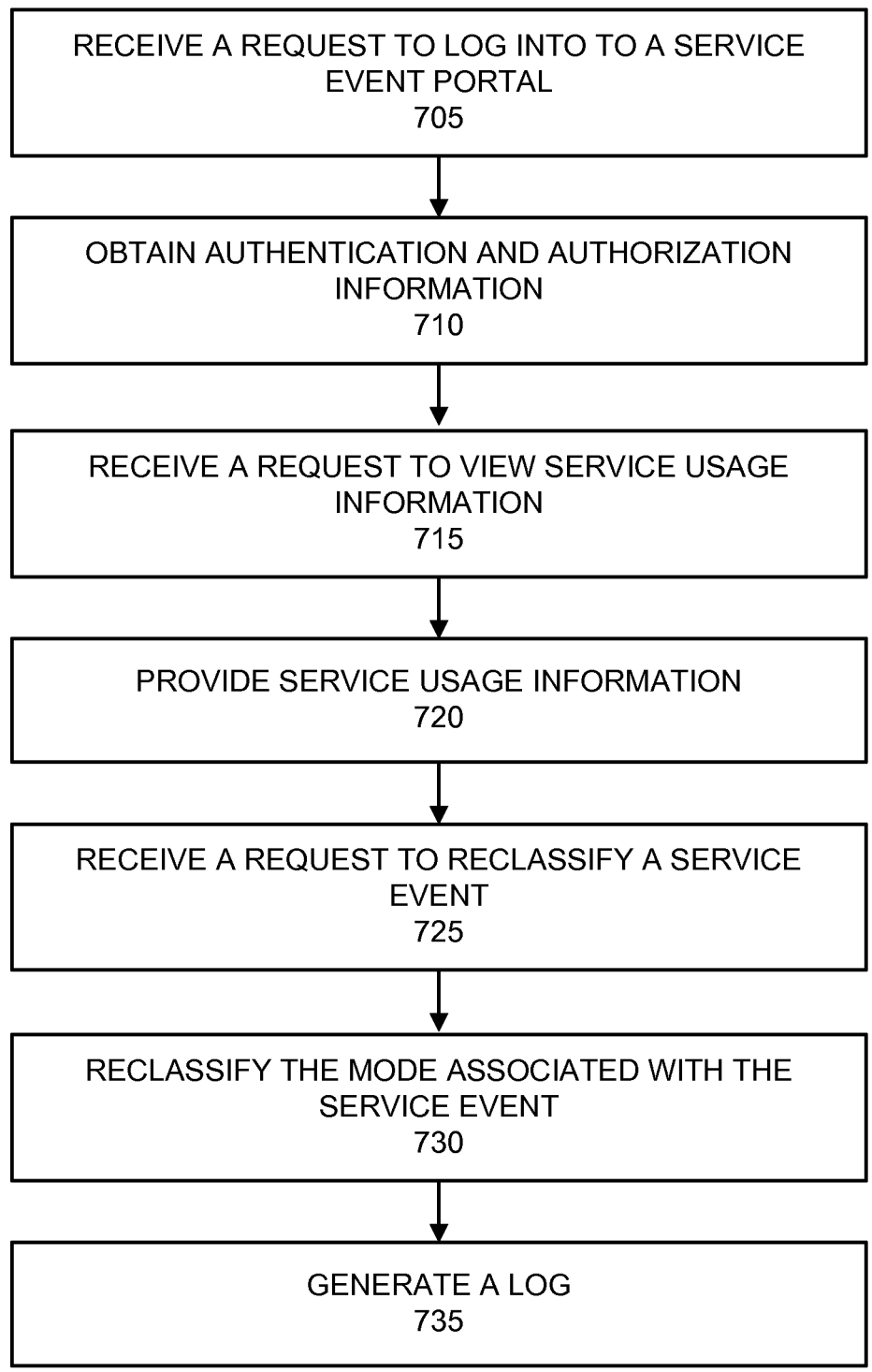
FIG. 7 is a flow diagram illustrating an exemplary process for managing service usage information.

FIG. 7 is a flow diagram illustrating an exemplary process 700 for managing service usage information according to an exemplary embodiment. Process 700 is performed by one or more of network devices 110 that include one or more network elements. For example, processor 305 of service usage portal 212 may execute software 315 to perform the steps described.

Process 700 begins, in block 705, with receiving a request to log into a service event portal. For example, user device 120 establishes a connection with service usage portal 212. Service usage portal 212 provides a user interface to allow the user to log into the service usage portal via user device 120.

In block 710, authentication and authorization information is obtained. For example, service usage portal 212 prompts the user, via a user interface, to provide log-in information (e.g., user name and password). Alternatively, the user may be prompted to utilize user device 120 in the authentication and authorization process (e.g., network device 110 may generate and send a one-time password to user device 120 that must match user credentials requested by usage portal 212). The user provides login information, which is received and verified by service usage portal 212. According to this example, it is assumed that the login information is valid.

In block 715, a request to view service usage information is received. For example, service usage portal 212 receives a user request to view service usage information pertaining to the user. According to an exemplary implementation, the user request may indicate a mode to which the service usage information pertains (e.g., a personal mode service usage information request). Alternatively, the user request may not indicate a mode (e.g., the user may access all service usage information pertaining to all modes).

In block 720, service usage information is provided. For example, service usage portal 212 provides access to service usage information (e.g., stored in service management 240). The user views the service usage information. For example, service usage portal 212 may provide user interfaces to allow the user to search for a particular service event, such as, by category (e.g., telephone call, usage of a service, etc.), by day, date, and/or time, by mode, etc.

In block 725, a request to reclassify a service event is received. For example, service usage portal 212 receives a request to change the mode associated with a service event. By way of example, the service usage information may indicate that a service event is correlated with a personal mode and the user requests that the mode be changed to a soccer coach mode.

In block 730, the mode associated with the service event is reclassified. For example, service usage portal 212 changes the mode classification associated with the service event in service management 240 (e.g., service usage history information, etc.).

In block 735, a log is generated. For example, audit log 232 generates a log of the user's activity in service usage portal 212, which includes the reclassification of the service event.

Although FIG. 7 illustrates an exemplary process 700 to enter a mode, process 700 may include additional operations, fewer operations, and/or different operations than those illustrated in FIG. 7 and described herein. For example, the service event portal may include a web service that allows any requesting application (e.g., versus an end user application) to access and use the portal. According to such an implementation, the service event portal may include application programming interfaces (APIs) that facilitate integration with external systems. For example, an enterprise system may access the service portal and access and use the service portal as set forth in process 700.

Figure 8:
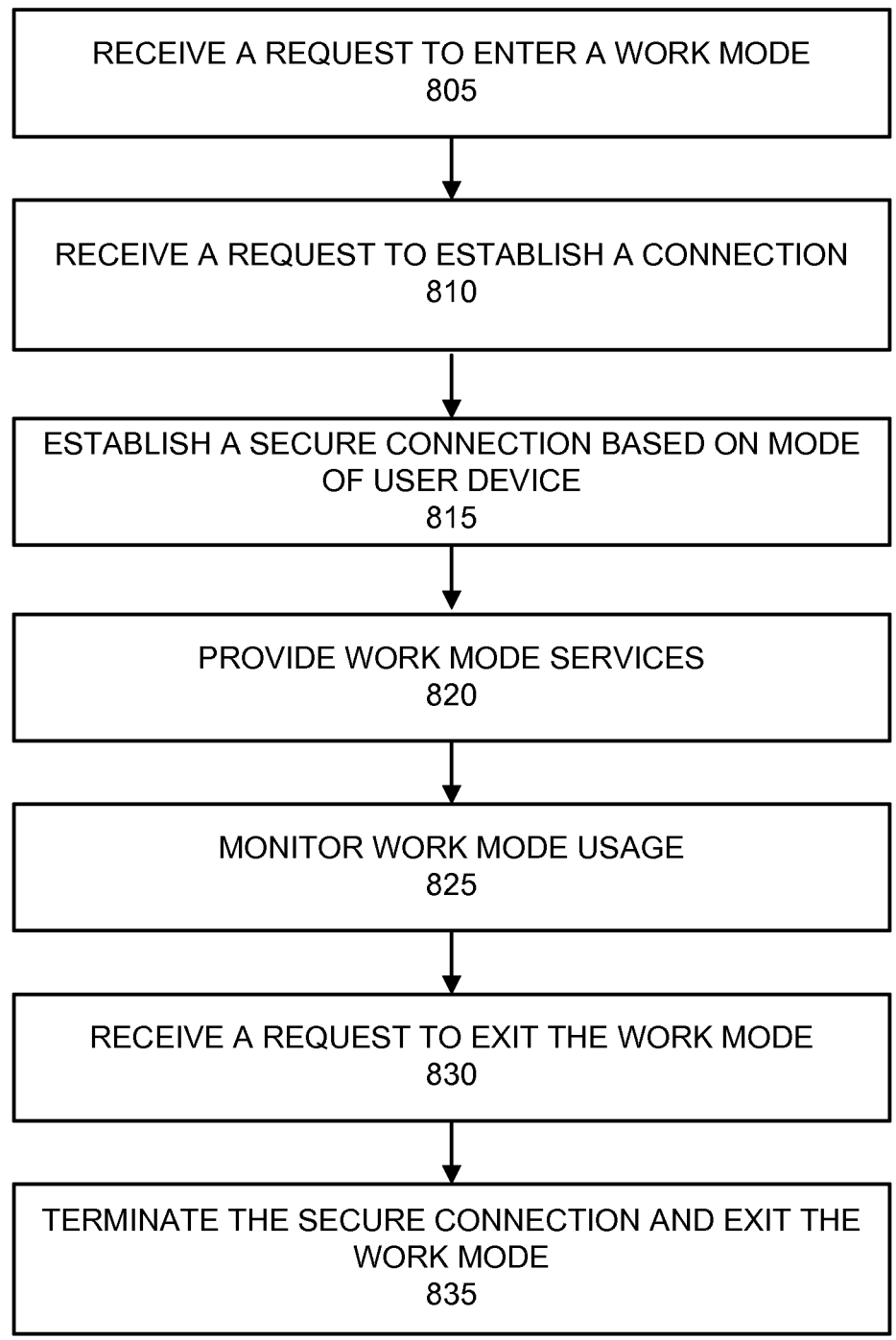
FIG. 8 is a flow diagram illustrating an exemplary process pertaining to a work mode of a user device and a network.

FIG. 8 is a flow diagram illustrating an exemplary process 800 pertaining to a work mode operation of user device 120 and network 105 according to an exemplary embodiment. Steps of process 800 are performed by one or more of network devices 110 that include one or more network elements. For example, processor 305 of network device 110 may execute software 315 to perform steps described. Additionally, steps of process 800 are performed by user device 120. For example, processor 305 of user device 120 may execute software 315 to perform steps described.

Process 800 begins, in block 805, receiving a request to enter a work mode. For example, user device 120 receives a user request (e.g., via a user interface, a voice command, etc.) to enter into work mode operation. User device 120 enters into work mode operation.

In block 810, a request to establish a connection is received. For example, user device 120 receives a user request to establish a network connection.

In block 815, a secure connection is established based on the mode of the user device. For example, user device 120 establishes a secure connection to a company network associated with the user's employer. According to an exemplary embodiment, user device 120 establishes the secure connection to the company network because user device is in the work mode.

In block 820, work mode services are provided. For example, network 105 provides work mode services to the user. For example, a work mode service may include a secured storage service that allows the user to store data on user device 120 and/or in network 105 (e.g., service management 240). Additionally, for example, a work mode service may include an encrypted communication service.

In block 825, the work mode usage is monitored. For example, mode monitor 222 of network 105 monitors the activity associated with user device 120. For example, mode monitor 222 may store policies pertaining to work mode usage and allowable service events that the user is afforded when user device 120 is in a work mode. For example, in relation to activities occurring within the company network, mode monitor 222 may not be able to monitor the user's activities. However, for other service events, mode monitor 222 may monitor the activity of the user and apply and enforce employer policies.

In block 830, a request to exit the work mode is received. For example, user device 120 receives a request to exit the work mode.

In block 835, the secured connection is terminated and the work mode is exited. For example, in response to the request to exit the work mode, user device 120 tears down the secured connection. Additionally, user device 120 exits the work mode. User device 120 enters a default mode of operation based on a user preference if user device 120 was not simultaneously operating in another mode.

Although FIG. 8 illustrates an exemplary process 800 to enter a mode, process 800 may include additional operations, fewer operations, and/or different operations than those illustrated in FIG. 8 and described herein.

According to an exemplary embodiment, and according to the exemplary scenario described in relation to process 800, network 105 may offer multi-mode services to third parties (e.g., employers associated with company networks). For example, a company network administrator may request of network 105 to revoke work mode services associated with work mode operation of user device 120 and work mode services provided by network 105 to a user. This may occur, for example, when the user abuses the policies of a work mode. According to an exemplary embodiment, mode controller 220 may include logic to initiate a work mode revocation process that prevents user device 120 operating in a work mode and prevents access to all work-mode services. According to another example, a company network administrator may request of network 105 to temporarily or permanently disable user device 120 or temporarily or permanently disable a work mode of user device 120. This may occur, for example, when the user reports that user device 120 is lost. The disablement of user device 120 and/or a work mode may further assist in protecting sensitive information, etc. According to an exemplary embodiment, mode controller 220 may include logic to initiate a disablement process. The disablement process may include deleting data stored on user device 120 and/or network 105, uninstalling applications, etc., and/or other types of disablements pertaining to the functionality and capabilities of user device 120 in a work mode.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 5-8, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 305, etc.), a combination of hardware and software (e.g., software 315), a combination of hardware and firmware, or a combination of hardware, firmware, and software. The embodiments have been described without reference to the specific software code since software can be designed to implement the embodiments based on the description herein.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 310.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
providing, by a network, multi-mode services for user devices that operate in multiple modes, wherein the multi-mode services include:
allowing users to view and manage usage information pertaining to modes of operation of user devices and service events that occurred during the modes of operation;
monitoring service events based on a mode in which user devices operate;
controlling service events based on a mode in which user devices operate; and
disabling a mode in which the user devices operate based on a detection of an abuse of a policy pertaining to the mode, wherein the disabling includes uninstalling an application of the user devices that is attributed to the abuse and preventing access to all mode services associated with the mode, wherein the application provides one of the services of the mode.

2. The method of claim 1, further comprising:
classifying service events based on information obtained from the monitoring service; and
storing classifications of service events as usage information.

3. The method of claim 2, wherein the allowing includes allowing users to reclassify service events that are correlated to one mode to another mode, and wherein the disabling includes:
detecting the abuse of the policy pertaining to the mode of a user device, wherein the mode is one of the multiple modes and the user device is one of the user devices; and
deleting data stored on the user device based on the detecting.

4. The method of claim 2, further comprising:
obtaining context information pertaining to service events; and
classifying the service events based on the context information.

5. The method of claim 1, further comprising:
storing log information that indicates what activities the users performed when using a portal included with the multi-mode services.

6. The method of claim 1, further comprising:
detecting a service event associated with one of the user devices;
determining a mode with which to correlate the service event;
determining a mode in which the one of the user devices is currently operating; and
causing the one of the user devices to operate in the mode with which the service event correlates in response to determining that the mode in which the one of the user devices is currently operating is different than the mode with which the service event correlates.

7. A network comprising network devices, wherein each network device comprises:
a communication interface;
a memory that stores instructions; and
a processor to execute the instructions, wherein at least one of the network devices, having at least one of the processors executes the at least one of instructions to:
monitor service events pertaining to user devices that operate in modes, wherein the modes include a personal mode and a work mode;
control the modes of operation pertaining to the user devices; and
disable the work mode based on a detection of an abuse of a policy pertaining to the work mode, wherein a disablement of the work mode includes uninstalling an application of the user devices that is attributed to the abuse and prevent access to all mode services associated with the work mode, wherein the application provides one of the mode services of the work mode.

8. The network of claim 7, wherein at least one of the network devices, having at least one of the processors executes the at least one of instructions to:
provide a service portal that includes user interfaces that allows users to view and manage usage information pertaining to the modes of operation of user devices and service events that occurred during the modes of operation.

9. The network of claim 7, wherein at least one of the network devices, having at least one of the processors executes the at least one of instructions to:
delete data stored on the user devices based on the detection.

10. The network of claim 7, wherein at least one of the network devices, having at least one of the processors executes the at least one of instructions to:
classify service events based on information obtained during monitoring of service events, wherein classifications correspond to the modes; and
store service event information and mode information that correlate to the service events.

11. The network of claim 10, wherein at least one of the network devices, having at least one of the processors executes the at least one of instructions to:
obtain context information pertaining to the service events; and
classify service events based on the information obtained during monitoring and the context information.

12. The network of claim 7, wherein at least one of the network devices, having at least one of the processors executes the at least one of instructions to:
detect a service event;
determine a mode with which to correlate the service event;
determine a mode in which one of the user devices is currently operating; and
cause the one of the user devices to operate in the mode with which the service event correlates in response to a determination that the mode in which the one of the user devices is currently operating is different than the mode with which the service event correlates.

13. One or more non-transitory storage media storing instructions executable by one or more computational devices, wherein the instructions comprise instructions to:

monitor service events pertaining to user devices that operate in modes, wherein the modes include a personal mode and a work mode;

control the modes of operation pertaining to the user devices; and disable the work mode based on a detection of an abuse of a policy pertaining to the work mode, wherein a disablement of the work mode includes uninstalling an application of the user devices that is attributed to the abuse and prevent access to all mode services associated with the work mode, wherein the application provides one of the services of the work mode.

14. The one or more non-transitory storage media of claim 13, wherein the instructions comprise instructions to:

classify service events based on information obtained during monitoring of service events, wherein classifications correspond to the modes; and store service event information and mode information that correlate to service events.

15. The one or more non-transitory storage media of claim 14, wherein the instructions comprise instructions to:

obtain context information pertaining to the service events; and classify the service events based on the information obtained during monitoring and the context information.

16. The one or more non-transitory storage medium of claim 13, wherein the instructions comprise instructions to:

provide a service portal that includes user interfaces that allows users to view and manage usage information pertaining to the modes of operation of user devices and service events that occurred during the modes of operation.

17. A method comprising:

providing, by a user device, modes of operation that include a personal mode;

receiving, by the user device, a user selection of one of the modes;

operating in the one of the modes, by the user device, in response to the receiving;

receiving, by the user device, a communication during an operation in the one of the modes;

receiving, by the user device, another communication during the operation in the one of the modes, wherein the other communication is received before a completion of the communication and the other communication is designated for another one of the modes, wherein the one of the modes is a higher priority mode relative to the other one of the modes;

providing, by the user device, a notification that indicates a receipt of the other communication, the other one of the modes, and a communication address of a party pertaining to the other communication, wherein the notification is provided in response to receiving the other communication; and permitting, by the user device, a user of the user device to override the higher priority mode and accept the other communication subsequent to the providing of the notification.

18. The method of claim 17, further comprising:

causing a notification to indicate an importance of the other communication and that the higher priority mode is to be overridden.

19. The method of claim 17, wherein the communication and the other communication are telephone calls.

20. The method of claim 17, further comprising:

omitting to receive permission to override the higher priority mode; and automating a communication, which is responsive to the other communication, based on the omitting, wherein the communication is selected based on a correlation between the party and the other one of the modes.

* * * * *